(12) United States Patent
Raden, II et al.

(10) Patent No.: US 9,031,995 B1
(45) Date of Patent: May 12, 2015

(54) DATA AGGREGATION AND CACHING

(75) Inventors: Gary Paul Raden, II, Seattle, WA (US); Antoun Kanawati, Seattle, WA (US); Jamie Hunter, Bothell, WA (US); Mukul Vijay Karnik, Redmond, WA (US); Roshith Rajagopal, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 752 days.

(21) Appl. No.: 12/320,780

(22) Filed: Feb. 4, 2009

(51) Int. Cl.
*G06F 17/30* (2006.01)

(52) U.S. Cl.
CPC ...... *G06F 17/3089* (2013.01); *G06F 17/30864* (2013.01)

(58) Field of Classification Search
CPC ................. G06F 17/3089; G06F 17/30864
USPC ........... 707/802–805; 709/203, 207; 715/733, 715/243, 764
See application file for complete search history.

(56) References Cited

U.S. PATENT DOCUMENTS

| | | | | |
|---|---|---|---|---|
| 5,819,092 | A * | 10/1998 | Ferguson et al. | 717/113 |
| 5,999,914 | A * | 12/1999 | Blinn et al. | 705/26.8 |
| 6,058,373 | A * | 5/2000 | Blinn et al. | 705/26.81 |
| 6,269,343 | B1 * | 7/2001 | Pallakoff | 705/26.2 |
| 6,484,149 | B1 * | 11/2002 | Jammes et al. | 705/26.62 |
| 7,441,187 | B2 * | 10/2008 | Meadows | 715/243 |
| 7,620,653 | B1 * | 11/2009 | Swartz | 1/1 |
| 7,702,646 | B2 * | 4/2010 | Rabines et al. | 707/805 |
| 2002/0188890 | A1 * | 12/2002 | Shupps et al. | 714/38 |
| 2004/0015476 | A1 * | 1/2004 | Twaddle | 707/1 |
| 2007/0112953 | A1 * | 5/2007 | Barnett | 709/224 |

OTHER PUBLICATIONS

Amiri et al. "Scalable template-based query containment checking for web semantic caches", dated Oct. 2002, 12 pages.*
Swartz, J., U.S. Appl. No. 11/275,862, filed Feb. 1, 2006, entitled "Service for Retrieving and Aggregating Data Used to Generate Web Pages or Other Content Items."

* cited by examiner

*Primary Examiner* — Monica Pyo
(74) *Attorney, Agent, or Firm* — Thomas | Horstmeyer, LLP (57) ABSTRACT

Systems and methods aggregate data and use caching techniques. In one implementation, a computer-implemented method aggregates data. A server receives a request for data that includes one or more identifiers. Based on at least one of the one or more identifiers, at least one template defining a view of the data is retrieved. One or more modules are identified based on the at least one template and one or more services are invoked to obtain the one or more modules. The one or more modules are received and processing by applying one or more business logic rules. At least a portion of the one or more processed modules are stored in a data store. The view of the data is generated based on the processed one or more modules and a response is transmitted to a client that includes the view of the data.

32 Claims, 4 Drawing Sheets

DATA AGGREGATION AND CACHING

BACKGROUND

I. Technical Field

The present disclosure generally relates to the field of computerized systems and methods. More particularly, the disclosure relates to computerized systems and methods that aggregate data and use caching techniques.

II. Background Information

In modern data provisioning, data is often gathered from multiple data sources over a network. The process of gathering data from multiple sources is generally referred to as data aggregation. Data is aggregated from the multiple sources in response to a request made by a requestor, which is typically referred to as a client. In order to aggregate the data, a server that receives the request may invoke services to gather the data and/or the services may call other services to gather the data. Furthermore, the services may need to perform computations to process the gathered data in order to provide the requested result to the client. As is evident from this process, efforts are often duplicated when aggregating, computing, and serving the data to the client.

One example of a circumstance in which data is aggregated repeatedly is that of a retailer that operates an electronic store. The retailer may operate in several regions that each have varying business requirements (e.g., different currencies) that dictate the data that should be included in product listings. As further examples, the retailer may need to use different product names, product images, and product descriptions under certain circumstances. Accordingly, a retailer may need different versions of a product listing for different regions (e.g., stores operating in different countries) and/or different entities (e.g., a retailer that also operates a subsidiary company or that provides product listings sold by other entities).

Aggregating the data that is necessary to generate, for example, product detail information may take a significant amount of time. For example, a client that has requested a product listing may not receive the product listing right away due to a delay caused by the aggregation process. Furthermore, some of the services that are called to assist generating the product listing may need to invoke other services. Generating the product detail information may depend upon results provided by the other services, which also may take time and add to the delay experienced by the client that requested the product listing.

Other delays and inefficiencies may occur during the aggregation process. For example, servers typically also need to aggregate data each time a client requests a document. As a result, when a server receives a request for a document that was previously transmitted to a client or a request for a document similar to one previously transmitted to a client, substantially all of the prior aggregation processing may need to be performed anew. Such repetition may require considerable processing capacity to handle requests from a large number of clients, thus introducing further inefficiency.

In view of the foregoing, data aggregation may produce inefficiencies due to the time incurred to gather the data and perform computations as well as the processing capacity needed to aggregate data each time a request is received. Accordingly, there is a need for improved systems and methods that alleviate these problems.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, or adding steps to the disclosed methods. Accordingly, the following detailed description is not limiting of the disclosed embodiments. Instead, the proper scope is defined by the appended claims.

Disclosed embodiments provide computer-implemented systems and methods for aggregating data and using caching techniques. In one embodiment, a host server may receive a request for data and construct a graph at runtime based on the type of information requested. For example, the host server may receive an identifier corresponding to the data that is requested. The identifier may correspond to a product listing or other requested data. The host server may then invoke dependent services and gather the requested data asynchronously. That is, these asynchronous events may occur independently of a main program flow, thereby allowing the main program flow to continue processing. The data may then be returned and passed back up the graph, where business logic that defines rules for processing and computing results based on the data is applied. Furthermore, the host server may cache the partially aggregated and partially computed results.

Consistent with a disclosed embodiment, a computer-implemented method is provided for aggregating data. The method may receive, at a server, a request for data. The request may include one or more identifiers. The method may further retrieve, based on at least one of the one or more identifiers, at least one template defining a view of the data. The method may identify one or more modules, based on the at least one template and invoke one or more services to obtain the one or more modules. The method may further receive the one or more modules, process the one or more modules by applying one or more business logic rules, and store at least a portion of the one or more processed modules in a data store. The method may generate the view of the data based on the processed one or more modules and transmit a response to a client. The response may include the view of the data.

Consistent with another disclosed embodiment, a computer-implemented method is provided for aggregating data. The method may receive, at a server, a request for data and invoke one or more services to obtain one or more modules. The method may further process the one or more modules and store at least a portion of the one or more processed modules. The method may generate a view of the data based on the processed one or more modules and transmit a response to a client. The response may include the view of the data.

Consistent with yet another disclosed embodiment, a computer-implemented method is provided for generating a view of data. The method may receive a request for the data and determine whether one or more computed modules are stored in a data store. The method may retrieve at least one processed module from the data store and invoke one or more services to obtain one or more additional modules. The method may process the one or more additional modules and generate the view of the data based on the at least one processed module and the one or more additional processed modules.

Consistent with still yet another disclosed embodiment, a system is provided for aggregating data. The system may comprise a server in communication with a network and a data store. The server may receive a request for data, invoke one or more services to obtain one or more modules, process the one or more modules, store at least a portion of the one or more processed modules, generate a view of the data based on the processed one or more modules, and transmit a response to a client. The response may include the view of the data. The data store may store the processed modules and be accessible by the server.

Consistent with other disclosed embodiments, a computer-readable storage medium may store program instructions for implementing any of the above-described methods.

It is to be understood that both the foregoing general description and the following detailed description are exemplary and explanatory only and are not restrictive of embodiments thereof, as claimed.

Figure 1:
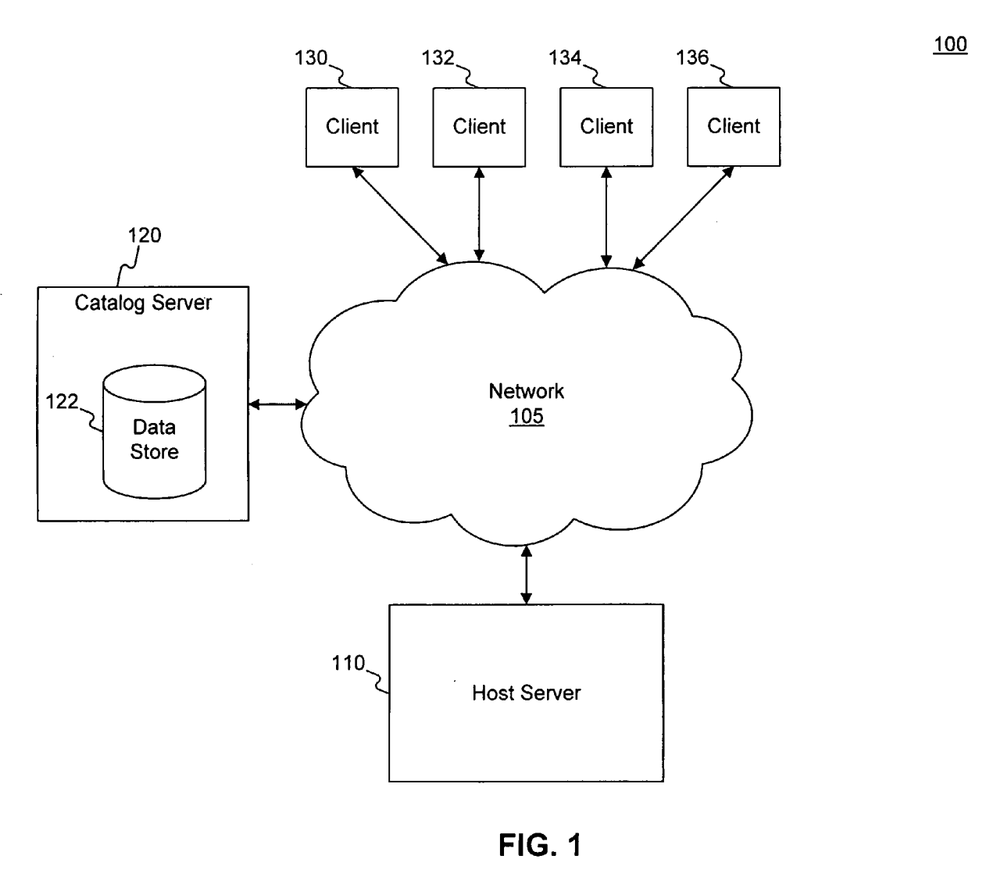
FIG. 1 is a diagram of an example of a system for aggregating and caching data.

FIG. 1 is an example of a system 100 for aggregating and caching data in accordance with one or more disclosed embodiments. In particular, system 100 may provide functionality for aggregating and caching data through the invocation of one or more services fulfilling a request from a client. As shown in system 100, host server 110, catalog server 120, and clients 130-136 are connected to a network 105. One of skill in the art will appreciate that although one host server, one catalog server, and four clients are depicted in FIG. 1, any number of these components may be provided. One of ordinary skill in the art will also recognize that functions provided by one or more components of system 100 may be combined. For example, functionality provided by host server 110 and catalog server 120 may be combined. Furthermore, although catalog server 120 is depicted, one of ordinary skill in the art will recognize that system 100 may include other servers, for example, such as an image server that stores image data.

Network 105 provides communications between the various components in system 100, such as host server 110, catalog server 120, and clients 130-136. In addition, host server 110, catalog server 120, and/or clients 130-136 may access legacy systems (not shown) via network 105, or may directly access legacy systems, data stores, or other network applications. Network 105 may be a shared, public, or private network, may encompass a wide area or local area, and may be implemented through any suitable combination of wired and/or wireless communication networks. Furthermore, network 105 may comprise an intranet or the Internet.

Host server 110 may comprise a general purpose computer (e.g., a personal computer, network computer, server, or mainframe computer) having one or more processors (not shown in FIG. 1) that may be selectively activated or reconfigured by a computer program. Host server 110 may also be implemented in a distributed network. For example, host server 110 may communicate via network 105 with catalog server 120 and/or additional host servers (not shown), which may enable host server 110 to distribute processes for parallel execution by a plurality of host servers. Alternatively, host server 110 may be specially constructed for carrying-out methods consistent with disclosed embodiments. Host server 110 may provide access to an Internet site, as well as provide functionality for authenticating users and transmitting data in connection with, for example, the sale of products and/or services. Additional details of host server 110 are discussed below in connection with FIG. 2.

Catalog server 120 may comprise a general purpose computer (e.g., a personal computer, network computer, server, or mainframe computer) having one or more processors (not shown) that may be selectively activated or reconfigured by a computer program. Furthermore, catalog server 120 may communicate via network 105 or may be in direct bilateral communication with host server 110. Catalog server 120 may also be implemented in a distributed network. For example, catalog server 120 may communicate via network 105 with one or more additional catalog servers (not shown) storing additional data.

Catalog server 120 may include a data store 122. Data store 122 may store data describing items (e.g., products and/or services) offered for sale by an Internet site provided by host server 110. For example, data store 122 may store item descriptions, prices, and media used in connection with the sale of the items. Media may include any images, photographs, sounds, and/or video clips that provide samples and/or information pertaining to the items. Products and/or services having information stored in data store 122 may be associated with a unique product identifier (ID) (e.g., a stock keeping unit (SKU)). In other implementations consistent with disclosed embodiments, other servers may be substituted for catalog server 120, such as servers storing other kinds of data.

Clients 130-136 may comprise general purpose computers (e.g., a personal computer, network computer, server, or mainframe computer) having one or more processors (not shown) that may be selectively activated or reconfigured by a computer program. Clients 130-136 may be any type device for communicating with host server 110 and/or catalog server 120 over network 105. For example, clients 130-136 may be personal computers, handheld devices (e.g., PDAs, cellular phones, etc.). Further, clients 130-136 may execute program instructions that provide one or more graphical user interfaces (GUIs) for interacting with network resources, such as host server 110 and/or catalog server 120. Host server 110 may retrieve appropriate data from catalog server 120 and/or other servers (not shown) and serve such data to clients 130-136.

Users may access host server 110 over network 105 through an Internet browser or a software application running on clients 130-136. For example, host server. 110 may transmit a document (e.g., a JavaScript Object Notation (JSON) document, an Extensible Markup Language (XML) document, or a web page) that is accessible by an Internet browser executing on one of clients 130-136. Because the Internet site may use a secure communication environment, such as an HTTPS (hypertext transfer protocol secure) environment to transfer data over network 170, data transfer is assumed to be secure.

In one implementation, host server 110 may provide functionality for aggregating data from services and present a complete view of a the data to clients 130-136. Although the following description refers to presenting a view of a product listing, one of ordinary skill in the art will appreciate that host server 110 may aggregate any kind of data and communicate with one or more services. Furthermore, host server 110 may implement data caching to more efficiently serve requests to clients 130-136 and data caching of partially aggregated results may occur at different levels of business logic computation. Data caching is described below in further detail.

Figure 2:
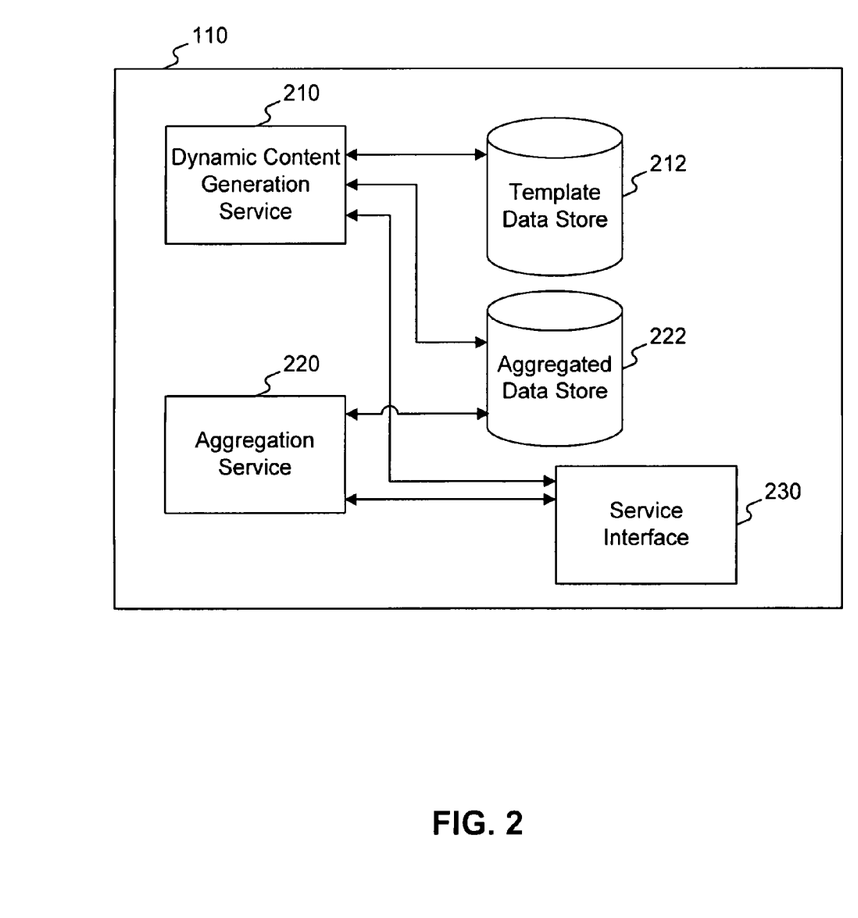
FIG. 2 is diagram of an example of an architecture of a server for aggregating and caching data.

FIG. 2 shows a diagram of an example architecture of host server 110, in accordance with one or more disclosed embodiments. Host server 110 may provide a dynamic content generation service 210 and an aggregation service 220. Dynamic content generation service 210 and aggregation service 220 may be stored in one or more memories (not shown) included in host server 110, such as RAM, ROM, magnetic storage, or optical storage, for example. Host server 110 may further may include a template data store 212, an aggregated data store 222, and a service interface 230.

In one implementation, host server 110 may omit dynamic content generation service 210. For example, dynamic content generation service 210 may be available to host server 110 via network 105. In an implementation in which dynamic content generation service 210 is omitted, clients 130-136 may communicate with host server 110 via service interface 230. In an implementation in which host server 110 includes dynamic content generation service 210 and aggregation service 220, clients 130-136 may communicate with host server 110 via dynamic content generation service 210 and/or service interface 230.

In operation, host server 110 may serve a document, web page, content, or other data. For example, host server 110 may transmit HTML documents, XML documents, or any other appropriate data over network 105. Host server 110 may execute dynamic content generation service 210 using, for example, a template processor (not shown) to generate a view of data using templates retrieved from template data store 212. The view of the data may provide appropriate data that is responsive to a particular request. The templates may, for example, be in the form of a Perl script, Java source code, Java byte code, or other set of instructions that may be interpreted or executed to generate a view of the data. The templates may further, for example, be provided in a data format, such as XML, JSON, or any other suitable data format. Furthermore, host server 110 may transmit the view of the data to one of clients 130-136 or may incorporate the view of the data into a document (e.g., a web page). For example, each template may correspond to a particular view of the data, such as product detail page of an electronic catalog or a search results page used to display search results. In one embodiment, each template may include or reference one or more other templates, such that multiple templates may be used in combination to generate the view of the data.

Aggregation service 220 may use one or more aggregators (not shown). Each aggregator may correspond to a particular group of services and service requests that are commonly used in combination to perform various tasks, such as generating web pages. For example, a product aggregator may be provided for retrieving and aggregating some or all of the different types of service data available for particular products. These different types of data may include catalog description, price, availability, customer reviews, average rating, marketplace listings, etc., with each supplied by a different service. These various types of product information are commonly included in the same web page (such as a product detail page). Furthermore, the template processor may send a number of separate service request for retrieving the product data. For example, aggregation service 220 may invoke one or more other services to retrieve the product data, which may be provided from other servers, such as catalog server 120.

Service interface 230 may provide a uniform mechanism for retrieving data from a set of services. Each service may supply a different type of data and may run on host server 110 and/or a separate server or group of servers. The services may, for example, provide data, such as catalog data, inventory data, session state data, user browsing histories, and user profiles and account information. The services may also provide functionality for performing various functions, such as authenticating users, executing purchase and/or rental transactions, generating personalized recommendations, posting content on a web site, and/or conducting interactive searches. Through service interface 230, the services may retrieve data over network 105 from other servers, such as catalog server 120. For example, the services may gather data, such as product information from data store 122 and may perform calculations on the data.

Although aggregation service 220 is part of the software executed by host server 110, aggregation service 220 may run on a different physical server. The aggregator for a particular instance of a content object may be implemented as an instance of a class of objects in an object oriented programming model. Furthermore, each aggregator may provide an interface for a template processor to request aggregated data.

In operation, host server 110 may receive a request for a view of data (e.g., product detail information) and retrieve an appropriate template corresponding to the request. Based on the template, host server 110 may identify one or more modules. A module may correspond to a portion of a graph that is used to retrieve the data. For example, a module may include one or more pieces of data, such as information related to a product, a person, or a place. The pieces of data may correspond to a data facet or component of the requested view of the data. In the example of a view of product detail information, a module may include a description facet, a price facet, an availability facet, etc. An exemplary product detail document is discussed below in connection with FIG. 3 in further detail.

In operation, aggregation service 220 may invoke one or more services via service interface 230 to obtain the one or more modules. The services may return the one or modules. For example, aggregation server 220 may dynamically return data that is gathered from one or more data stores, such as data store 122. Aggregation server 220 may store the received data as partially aggregated and/or partially computed results in aggregated data store 222.

In some implementations, aggregated data store 222 may store partially aggregated and/or partially computed results that are provided by aggregator service 220 according to certain rules. For example, business logic rules may determine which results to cache and a time period for which the results should be stored. Furthermore, business logic rules may dictate the extent to which partially computed results should be stored. For example, aggregated data store 222 may store a partially computed result that may be an intermediary result that is ultimately useful for generating more than one view. Accordingly, during the execution of aggregation service 220, aggregation service 220 may determine whether partially aggregated and/or partially computed results needed for a particular result are already available, thus saving time in serving a response.

Furthermore, partially aggregated results may be nested within one another. For example, a partially aggregated result may use results that were obtained from one or more dependent services and/or other partially aggregated results. As discussed above, the data from each of these sources can be individually cached for a different time period (e.g., a time to live or TTL). The resulting aggregated data may be cached for a time that is a minimum TTL of the TTLs corresponding to the sources. For example, host server 110 may associate a TTL with each source and then aggregate the TTLs to determine how long to cache the partially aggregated result. Furthermore, the TTL may comprise a predetermined time period that is based on a data category, or other criteria, such as a frequency at which that the data has been historically accessed.

For example, in case of a product aggregator service, offer information typically changes very frequently and might be cached for a short time (e.g., five minutes). However, image information may not change as often and might be cached for a longer time (e.g., thirty minutes). Catalog information may change even less frequently and might be cached for an even longer time (e.g., two hours). As an example using the foregoing TTLs for data categories, a partially aggregated result containing image and catalog information may be cached for thirty minutes (i.e., the minimum of the thirty minutes and two hours TTLs, respectively). As another example, a partially aggregated result containing both image information and offer information may be cached for five minutes (i.e., the minimum of the thirty minutes and five minutes TTLs, respectively). As yet another example, a partially aggregated result containing offer information, catalog information, and image information may also be cached for five minutes (i.e., the minimum of the five minutes, two hours, and thirty minutes TTLs, respectively).

In one embodiment, aggregation service 220 may implement a demand driven graph construction algorithm to efficiently retrieve data. The demand driven graph construction algorithm may create a graph for a request at runtime and aggregation service 220 may use the graph to gather the modules needed to fulfill the request. Additional details describing the demand driven graph construction algorithm are provided, for example, in U.S. patent application Ser. No. 11/275,862, filed Feb. 1, 2006, entitled "Service for Retrieving and Aggregating Data Used to Generate Web Pages or Other Content Items," the contents of which are expressly incorporated herein by reference.

Although not shown in FIG. 2, host server 110 may include additional data stores, such as, for example, a username and password data store, a user profile data store, a user transaction history data store, a preference data store, etc. For example, the username and password data store may store username and password combinations for users of one or more Internet sites provided by host server 110. The user profile data store may store information pertaining to users, such as name, billing address, shipping address, payment information (e.g., credit card, debit card, account numbers, etc.), age, occupation, etc. The user transaction history data store may store transaction histories of users relating to transactions. Transactions may include any activities participated in by users and/or provided by an Internet site, such as, for example, game histories, email histories, auction histories, download histories, search histories, and/or purchase histories. For example, a purchase history may include information about orders including completed orders (e.g., orders for products and/or services that have been shipped or provided), open orders (e.g., orders for products and/or services that have been placed, but have not been shipped or provided), past items that have been viewed and/or added to a shopping cart, and/or search results. The preference data store may include ratings information for any items or topics, including ratings of items previously purchased or owned by a user, or ratings of any topic of interest (e.g., news, sports, entertainment, products, etc.) to a user.

Figure 3:
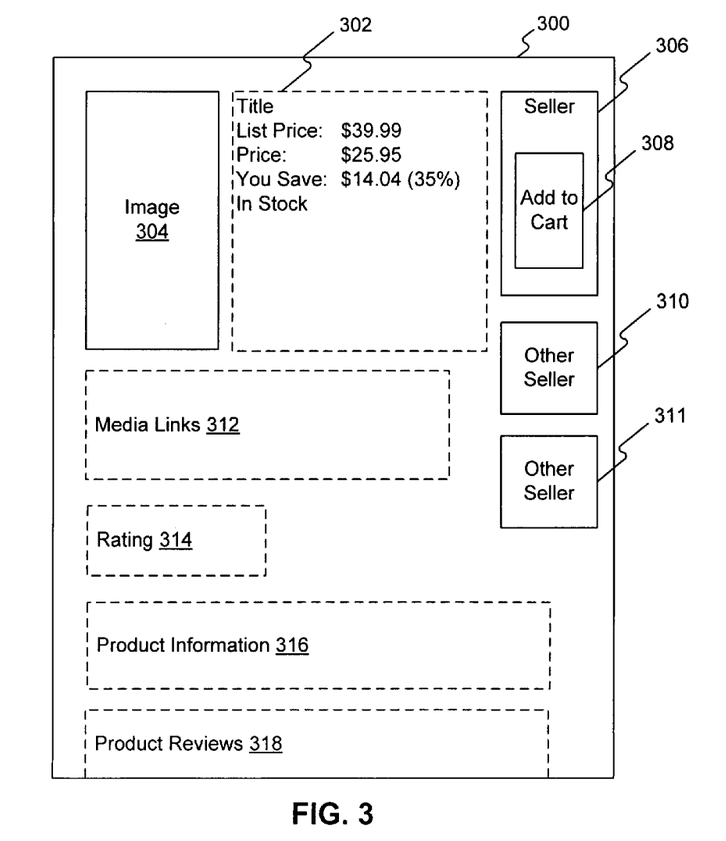
FIG. 3 is an example of a document that includes data aggregated by the server shown in FIG. 2.

FIG. 3 is an example of a document 300, consistent with one or more disclosed embodiments. Document 300 is an example of a document including product detail information. Although the example discussed in connection with FIG. 3 concerns a product detail document, one of ordinary skill in the art will appreciate that other documents, such as search results document including search results, or any other appropriate document (e.g., webpage content, media, etc.) may be provided.

As discussed above, host server 110 may generate a view of data and transmit the requested view to one of clients 130-136 and/or generate and transmit document 300 to one of clients 130-136. For example, one of clients 130-136 may send a request to host server 110 for document 300. As shown in FIG. 3, document 300 may include various areas 302-318. Each of areas 302-318 may represent a set of data that is related or grouped together. For example, area 302 includes data describing the product and may include attributes such as an "Item Name," a "List Price," a "Price," a "You Save" amount, and a "Status" (e.g., "In Stock"). Data that is shown in document 300 that corresponds to the attributes shown in area 302 are "Title," "$39.99," "$25.95," "$14.04 (35%)," and "In Stock," respectively. The specific attributes and data of area 302 may depend upon business logic rules and/or identifiers received with a request for document 300, which are discussed below in further detail.

Document 300 may also include additional information about the product. For example, image 304, which may be positioned near the top of document 300 and area 302, may provide an image of the product (e.g., jpg, gif, etc.). Furthermore, the image that is selected as image 304 may depend upon business logic rules. Document 300 may further include a buy box 306, which may include a name of a "Seller." For example, a person viewing document 300 as a web page may select "Add to Cart" button 308 to add the product to a shopping cart for purchase. Areas 310 and 311 may identify other sellers, which may offer the same product for sale. Areas 310 and 310 may provide a user with the option of purchasing the product through selection of, for example, "Add to Cart" icons (not shown) included in areas 310 and 311.

Area 312 may include one or more media links to information pertaining to the product. For example, a product listing for a DVD may provide media links to video clips providing a sample of the content available on the DVD. Area 314 may provide a rating of the product (e.g., a numerical score), area 316 may provide a product description, and area 318 may provide product reviews (e.g., reviews submitted by customers and/or visitors that have viewed document 300).

As discussed above, host server 110 may aggregate data to generate a view of data, which may be incorporated into document 300 using business logic rules. For example, when host server 110 receives a request for a view of data, the request may include one or more identifiers pertaining to the request. The identifiers may include one or more of an entity identifier (e.g., a merchant ID), a region identifier (e.g., a country ID or a marketplace ID), and a requested data ID (e.g., a product ID). In the example being discussed related to a request for a product detail document, the request may include a merchant ID, a marketplace ID, and a product ID (e.g., a stock keeping unit (SKU)).

As shown in document 300, a "You Save" amount is calculated by taking the "List Price" and subtracting the "Price" in order to arrive at the savings. However, certain regions may have different rules pertaining to the calculation of savings. For example, a country may have rules that regulate whether or not savings can be shown and/or how the savings amount is calculated. For example, some countries have rules about savings that require a retailer to include a last published price and a price if purchased, a price if purchased separately or together with another product. Furthermore, some countries may allow only currency savings (i.e., the actual amount), but not a savings percentage to be advertised. Furthermore, the entity providing document 300 may not want to provide savings information for certain products if the savings amount is small.

Different marketplace IDs (e.g., whether the site is a U.S. site, international site, or an affiliate site, etc.) may each have their own business logic rules. For example, image 304 may differ depending upon whether the product (e.g., a book) is being sold to customers in the United States or another country. During the aggregation process discussed below, host server 110 may generate an appropriate view of the data based upon the received request.

Figure 4:
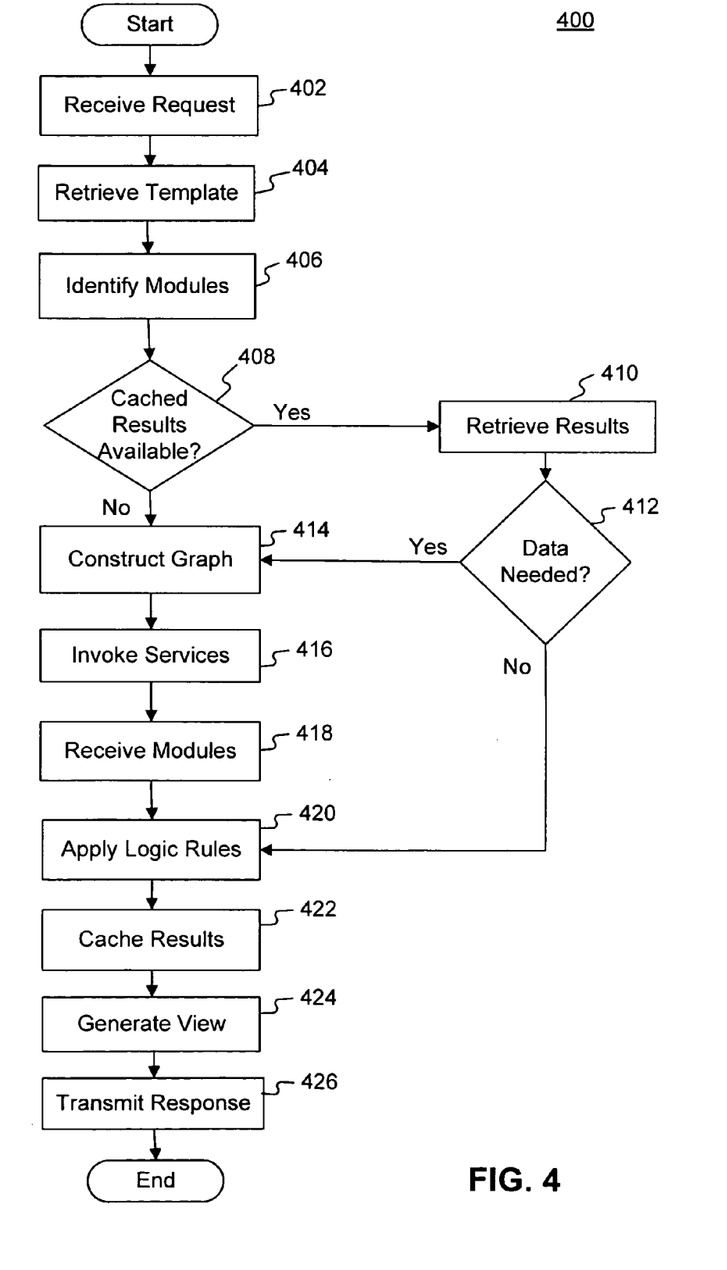
FIG. 4 is a flow diagram of an example of a routine for aggregating and caching data.

FIG. 4 is a flow diagram of an example of a routine 400 for aggregating and caching data, consistent with one or more disclosed embodiments. Routine 400 may implement processes according to one or more of program modules stored in memory of host server 110. In the following discussion, host server 110 may retrieve appropriate data to assemble a view of data, such as a view of data suitable for a product listing (e.g., such as the data shown in document 300). Although discussed in connection with a product listing, host server 110 may implement routine 400 to generate a view of any appropriate data.

At the start of routine 400, in block 402, host server 110 may receive a request for data from one of clients 130-136. For example, the request may pertain to a product listing (e.g., a user at one of clients 130-136 has selected an address or provided an address for the product listing). The request may include one or more identifiers related to the request. For example, for a product listing, the identifiers may include a merchant ID corresponding to a seller and a product ID corresponding to product that is sold by the seller.

Next, in block 404, host server 110 may invoke dynamic content generation service 210 to retrieve one or more templates that defines a view of the requested data. For example, in the example of a product listing, the template may provide product detail information for an electronic catalog. Furthermore, the template may include or reference one or more other templates, such that multiple templates may be used in combination to generate the view of the data.

In block 406, dynamic content generation service 210 may identify one or more modules based on the retrieved one or more templates. Each module may include one or more pieces of data, such as information related to a product, a person, or a place. In the present example, each module may include information related to the requested product listing.

Next, in decision block 408, dynamic content generation service 210 may determine whether partial results that are needed to fulfill the request are already stored, i.e., cached. As part of the determination, host server 110 may reference the retrieved one or more templates to determine whether any partial results are already stored in aggregated data store 222 and/or other servers over network 105. If partial results are stored in one or more data stores that are available to host server 110, then routine 400 proceeds to block 410. If partial results are not stored, then routine 400 proceeds to block 414.

In block 410, host server 110 may retrieve the partial results from aggregated data store 220 and/or other servers over network 105 based on the one or more retrieved templates and/or received identifiers.

Next, in block 412, dynamic content generation service 210 may determine whether additional data is needed to generate the view of the data. If additional data is needed, then routine 400 proceeds to block 414. If additional data is not needed, then routine 400 proceeds to block 420. In the event that additional data is not needed (i.e., all results are already cached), routine 400 need not invoke any additional services to gather results.

In block 414, host server 110 may construct a graph using, for example, the demand driven graph construction algorithm referenced above. Host server 110 may invoke aggregation service 220 to construct the graph. Furthermore, host server 110 may construct the graph based on the requirements of a particular retrieved template and/or identifiers received by the request to identify the needed data and services that provide the needed data. Although the use of a graph and the demand drive graph construction algorithm are referred to in connection with block 414, one of ordinary skill will recognize that host server 110 may use other techniques and/or algorithms to efficiently retrieve the data.

In block 416, aggregation service 220 may invoke the services identified by the retrieved templates and/or identifiers to gather the modules that are needed according to the graph.

In block 418, aggregation service 220 may receive the modules asynchronously from the invoked services over network 105. For example, aggregation service 220 may receive the modules as the invoked services return results based on a traversal of the graph. As aggregation service 220 receives the modules, host server 110 may cache partially aggregated and/or partially computed results in aggregated data store 222 and/or other data stores available over network 105. That is, caching may occur in block 418 to store partially aggregated and/or partially computed results, such as the received modules, as they are received by host server 110.

In block 420, host server 110 may apply business logic rules that define processing and computing requirements to process the received modules. For example, the received modules may include facets or components of a product detail document, such as pricing information, product images, product descriptions, product ratings, product reviews, etc. The business logic rules may specify how to compute results based on the retrieved templates and/or the identifiers (e.g., merchant ID, marketplace ID, and product ID) included with the request. As host server 110 applies business logic rules, host server 110 may cache partially aggregated and/or partially computed results in aggregated data store 222 and/or other data stores available over network 105. That is, caching may occur in block 420 to store partially aggregated and/or partially computed results, such as the processed modules, as they are processed by host server 110.

In the example being discussed of a product detail document, the data may include, for example, a "You Save" amount component, as discussed above. The business logic rules for one region ID (e.g., the U.S.) may specify that the "You Save" amount is calculated by taking the "List Price" and subtracting the "Price" in order to arrive at the savings, as well as calculating a percentage savings. However, if the received request included another region ID (e.g., a European country), then a different rule pertaining to the calculation of savings may apply (e.g., the product listing may not include the calculation of a percentage savings). Furthermore, different marketplace IDs (e.g., whether the site is a U.S. site, international site, or an affiliate site, etc.), which may be included with the request received in block 402, may each have their own business logic rules that may be applied in block 420.

In block 422, host server 110 may cache partially aggregated and/or partially computed results in aggregated data store 222 and/or other data stores available over network 105. For example, aggregation service 220 may store the partially aggregated and/or partially computed results based upon business logic rules. The business logic rules may specify which results to store and/or a time period for which the results should be stored. Host server 110 may retrieve the partially aggregated and/or partially computed results at a later time, for example, when host server 110 receives a request for the same document, or a similar document that includes one or more of the stored results. The amount of time that the partially aggregated and/or partially computed results are stored may vary, as discussed above.

In block 424, host server 110 may generate the view of the data using the processed modules. Next, in block 426, host server 110 may transmit the view of the data to the one of clients 130-136 that made the request. For example, host server 110 may transmit the view of the data to one of clients 130-136 in raw form, where the view of the data is subsequently processed by a web service or a document service for incorporation into a document. Alternatively, host server 110 may locally process the view of the data to incorporate the view of the data in a document, such as a product detail document (e.g., document 300), a search results document, or a content document.

As one of ordinary skill in the art will appreciate, one or more of blocks 402-426 may be optional and may be omitted from implementations in certain embodiments. Furthermore, one or more of blocks 402-426 may occur in parallel or substantially in parallel. In some implementations, blocks 402-426 may be reordered, include substitute steps, and/or include additional steps. Moreover, while the above discussion refers to host server 110 as performing one or more of blocks 402-426, one of ordinary skill in the art will appreciate that other components of system 100 may perform one or more of blocks 402-426.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting or deleting blocks. It is intended, therefore, that the specification and examples be considered as exemplary only, with a true scope and spirit being indicated by the following claims and their full scope of equivalents.

What is claimed is:

1. A computer-implemented method for aggregating data, comprising:
   receiving, at a server, a request for data, the request including one or more identifiers;
   retrieving, based at least in part on at least one of the one or more identifiers, at least one template defining a view of the data;
   identifying a module of the view, based at least in part on the at least one template;
   invoking, after the identifying, one or more services to obtain the module;
   processing the module by applying one or more business logic rules, thereby generating a processed module;
   storing at least a portion of the processed module in a data store;
   generating the view of the data based at least in part on the processed module;
   transmitting a response to a client, wherein the response includes the view of the data;
   wherein the view of the data is aggregate data generated as a function of one or more data sets; and
   wherein the at least a portion of the processed module is stored in the data store for a predetermined period of time.

2. The computer-implemented method of claim 1, wherein the module corresponds to a portion of a graph.

3. The computer-implemented method of claim 1, wherein one or more of identifying the module, invoking the one or more services, processing the module, or storing the at least a portion of the processed module occur at least partially in parallel.

4. The computer-implemented method of claim 1, wherein the at least one template includes or references one or more additional templates.

5. The computer-implemented method of claim 1, wherein the view of the data is incorporated into a document.

6. The computer-implemented method of claim 5, wherein the document is a product detail document, a search results document, or a content document.

7. The computer-implemented method of claim 1, wherein the one or more business logic rules comprise rules specifying computations related to the module.

8. The computer-implemented method of claim 1, wherein the processed module is a first processed module, and further comprising:
   retrieving at least one processed second module from the data store, wherein the view of the data is generated based at least in part on the processed first module and the at least one processed second module.

9. The computer-implemented method of claim 1, wherein the predetermined period of time is based at least in part on a data category.

10. The computer-implemented method of claim 1, wherein the predetermined period of time is based at least in part on a data frequency.

11. A computer-implemented method for aggregating data, comprising:

receiving, at a server, a request for data;
retrieving, based at least in part on at least one or more identifiers included in the request, at least one template defining a view of the data;
identifying module data based at least in part on the at least one template;
invoking one or more services to obtain module data;
processing the module data, thereby generating processed module data;
storing at least a portion of the processed module data;
generating a view of the data based at least in part on the processed module data;
transmitting a response to a client, the response including the view of the data;
wherein the view of the data is aggregate data generated as a function of one or more data sets; and
wherein the at least a portion of the processed module data is stored in the data store for a predetermined period of time.

12. The computer-implemented method of claim 11, wherein the request includes one or more identifiers, the computer-implemented method further comprising:
retrieving, based at least in part on at least one of the one or more identifiers, at least one template for generating the view of the data.

13. The computer-implemented method of claim 11, wherein the request includes one or more identifiers, the computer-implemented method further comprising:
identifying the module data based at least in part on at least one template.

14. The computer-implemented method of claim 13, wherein identifying the module data is further based at least in part on the one or more identifiers.

15. The computer-implemented method of claim 11, wherein processing the module data comprises applying one or more business logic rules to at least a portion of the module data.

16. The computer-implemented method of claim 15, wherein the one or more business logic rules specify computations related to the module data.

17. The computer-implemented method of claim 11, wherein the at least a portion of the module data is stored in a data store included in the server.

18. The computer-implemented method of claim 11, wherein the at least a portion of the module data is stored in a data store accessible over a network.

19. The computer-implemented method of claim 11, wherein the predetermined period of time is based at least in part on a data category.

20. The computer-implemented method of claim 11, wherein the predetermined period of time is based at least in part on a data frequency.

21. The computer-implemented method of claim 11, wherein the module data comprises information related to a product, a person, or a place.

22. The computer-implemented method of claim 11, wherein the view of the data is incorporated into a document.

23. The computer-implemented method of claim 22, wherein the document is a product detail document, a search results document, or a content document.

24. The computer-implemented method of claim 11, wherein the module data includes a component of the view.

25. A computer-implemented method for generating a view of data, comprising:
receiving, by one or more computing devices, a request for the data;
retrieving, based at least in part on at least one or more identifiers included in the request, at least one template defining the view of the data;
identifying processed module data based at least in part on the at least one template;
determining, by at least one of the one or more computing devices, whether the processed module data is stored in a data store;
retrieving, by the at least one of the one or more computing devices, the processed module data from the data store;
invoking, by the at least one of the one or more computing devices, one or more services to obtain additional module data;
processing, by the at least one of the one or more computing devices, the additional module data to generate additional processed module data;
generating, by the at least one of the one or more computing devices, the view of the data based at least in part on the processed module data and the additional processed module data;
wherein the view of the data is aggregate data generated as a function of one or more data sets; and
wherein the at least a portion of the processed module is stored in the data store for a predetermined period of time.

26. The computer-implemented method of claim 25, further comprising storing, by the at least one of the one or more computing devices, after the processing, the one or more additional module data in the data store.

27. The computer-implemented method of claim 25, further comprising:
transmitting, by the at least one of the one or more computing devices, a response to a client, the response including the view of the data.

28. The computer-implemented method of claim 25, wherein the predetermined period of time is based at least in part on a data category.

29. The computer-implemented method of claim 25, wherein the predetermined period of time is based at least in part on a data frequency.

30. The computer-implemented method of claim 25, wherein the processed module data and the additional processed module data include a respective component of the view.

31. A system for aggregating data for a document, comprising:
one or more computing devices in communication with a network, configured to:
receive a request for data;
retrieving, based at least in part on one or more identifiers included in the request, at least one template defining a view of the data;
identifying module data based at least in part on the at least one template;
invoke one or more services to obtain the module data;
process the module data, thereby generating processed module data;
store at least a portion of the processed module data;
generate a view of the data based at least in part on the processed module data;
transmit a response to a client, the response including the view of the data;
a data store storing the processed module data, wherein the data store is accessible by at least one of the one or more computing devices;
wherein the view of the data is aggregate data generated as a function of one or more data sets; and wherein the at least a portion of the processed module data is stored in the data store for a predetermined period of time.

32. The system of claim 31, wherein the module data includes a respective component of the view.

* * * * *